US009277527B2

(12) United States Patent
Bhuyan

(10) Patent No.: US 9,277,527 B2
(45) Date of Patent: Mar. 1, 2016

(54) WIRELESS ACCESS NODE CALIBRATION CAPABILITY FOR IMPROVED MOBILE WIRELESS DEVICE LOCATION ACCURACY

(71) Applicant: Alcatel-Lucent USA Inc., Murray Hill, NJ (US)

(72) Inventor: Arupjyoti Bhuyan, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 83 days.

(21) Appl. No.: 14/197,377

(22) Filed: Mar. 5, 2014

(65) Prior Publication Data

US 2015/0257123 A1    Sep. 10, 2015

(51) Int. Cl.
| | | |
|---|---|---|
| *H04W 24/00* | (2009.01) | |
| *H04M 11/04* | (2006.01) | |
| *H04B 1/38* | (2015.01) | |
| *H04M 1/00* | (2006.01) | |
| *H04W 64/00* | (2009.01) | |
| *G01S 5/02* | (2010.01) | |
| *H04W 84/12* | (2009.01) | |

(52) U.S. Cl.
CPC ........... *H04W 64/006* (2013.01); *G01S 5/0252* (2013.01); *H04W 84/12* (2013.01)

(58) Field of Classification Search
CPC ..... H04W 64/00; H04W 12/06; H04W 24/00; H04W 24/08
USPC ........... 455/404.2, 423, 424–425, 456.1, 561, 455/550.1, 456.5, 456.6
See application file for complete search history.

(56) References Cited

U.S. PATENT DOCUMENTS

| | | | | |
|---|---|---|---|---|
| 2002/0098839 | A1* | 7/2002 | Ogino | G01S 5/02 455/424 |
| 2003/0119496 | A1* | 6/2003 | Gaal | G01S 1/024 455/424 |
| 2007/0247366 | A1* | 10/2007 | Smith | G01S 5/021 342/464 |
| 2010/0190509 | A1* | 7/2010 | Davis | H04W 56/006 455/456.1 |
| 2012/0149388 | A1* | 6/2012 | West | G01S 5/00 455/456.1 |
| 2014/0185520 | A1* | 7/2014 | Gao | H04W 64/00 370/328 |
| 2015/0148059 | A1* | 5/2015 | Puthenpura | H04W 64/003 455/456.1 |

* cited by examiner

*Primary Examiner* — Dung Hong
(74) *Attorney, Agent, or Firm* — Wall & Tong, LLC

(57) ABSTRACT

A capability for determining an offset of a wireless access node is presented. The determined offset of the wireless access node may be used by a location determination process associated with the wireless access node and configured to determine locations of mobile wireless devices that are communicating via the wireless access node. The offset of a wireless access node may be determined by determining a known location of a device when the device communicates via the wireless access node, determining an estimated location of the device when the device communicates via the wireless access node where the estimated location of the device is determined using the location determination process associated with the wireless access node, and determining the offset of the wireless access node based on the known location of the device and the estimated location of the device.

21 Claims, 4 Drawing Sheets

WIRELESS ACCESS NODE CALIBRATION CAPABILITY FOR IMPROVED MOBILE WIRELESS DEVICE LOCATION ACCURACY

TECHNICAL FIELD

The disclosure relates generally to communication networks and, more specifically but not exclusively, to calibration of a wireless access node of a wireless communication network.

BACKGROUND

Mobile wireless devices access communication networks via wireless access nodes, such as via base stations in cellular wireless communication networks, via wireless access points in Wireless Fidelity (WiFi) networks, or the like. There are various services and applications which may make use of the geographic location of a mobile wireless device, and there are several types of location determination processes by which the location of a mobile wireless device may be determined for use in supporting such services and applications. Most, if not all, such location determination processes rely on accurate calibration of the bias or offset that is introduced by the wireless access node via which the mobile wireless device communicates. For example, while a time-of-arrival (ToA) measurement from a base station to a cellular device (e.g., a cellular phone, a smartphone, or the like) may be used to estimate the location of the cellular device, this ToA measurement includes an offset introduced by the base station due to internal delays of the base station. While existing mechanisms for calibration of a wireless access node attempt to measure these delays for various modules of the wireless access node (e.g., each radio frequency (RF) module of a base station), and reduce them to acceptable levels, this is a complex process and accuracy is not guaranteed. In addition, environmental factors associated with a wireless access node can introduce additional offset that is unique to the wireless access node and that is not accounted for by existing mechanisms for calibration of a wireless access node.

SUMMARY OF EMBODIMENTS

Various deficiencies in the prior art may be addressed by embodiments for determining an offset of a wireless access node.

In at least some embodiments, an apparatus includes a processor and a memory communicatively connected to the processor, where the processor is configured to determine an offset of a wireless access node. The processor is configured to determine a known location of a device for a communication received at the wireless access node from the device. The processor is configured to determine, based on a location determination process associated with the wireless access node, an estimated location of the device for the communication received at the wireless access node from the device. The processor is configured to determine an offset of the wireless access node based on the known location of the device and the estimated location of the device.

In at least some embodiments, a method includes using a processor and a memory for determining an offset of a wireless access node. The method includes determining a known location of a device for a communication received at the wireless access node from the device. The method includes determining, based on a location determination process associated with the wireless access node, an estimated location of the device for the communication received at the wireless access node from the device. The method includes determining an offset of the wireless access node based on the known location of the device and the estimated location of the device.

In at least some embodiments, a computer-readable storage medium stores instructions which, when executed by a computer, cause the computer to perform a method for determining an offset of a wireless access node. The method includes determining a known location of a device for a communication received at the wireless access node from the device. The method includes determining, based on a location determination process associated with the wireless access node, an estimated location of the device for the communication received at the wireless access node from the device. The method includes determining an offset of the wireless access node based on the known location of the device and the estimated location of the device.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

Mobile wireless devices access communication networks via wireless access nodes, such as via base stations in cellular communication networks, via wireless access points (WAPs) in Wireless Fidelity (WiFi) networks, or the like. There are various services and applications which may make use of the geographic location of a mobile wireless device, and there are several types of location determination processes by which the location of a mobile wireless device may be determined for use in supporting such services and applications for the mobile wireless device. Most, if not all, such location determination processes rely on accurate determination of the bias, or offset, that is introduced by the wireless access node with which the mobile wireless device is communicating. In at least some embodiments, a capability is provided for determining an offset of a wireless access node (e.g., for use by a location determination process configured to determine locations of mobile wireless devices communicating via the wireless access node). In at least some embodiments, the offset of a wireless access node is determined using a location determination process associated with the wireless access node. In at least some embodiments, the offset of a wireless access node is determined by determining a known location of a device for a communication by the device via the wireless access node, determining an estimated location of the device for the communication by the device via the wireless access node where the estimated location of the device is determined using a location determination process associated with the wireless access node, and determining the offset of the wireless access node based on the known location of the device and the estimated location of the device. Various embodiments of the capability for determining the offset of a wireless access node using a location determination process associated with the wireless access node enable the wireless access node to achieve better location accuracy while reducing or even eliminating the need to calculate or calibrate the complex internal delays in the wireless access node. These and various other embodiments of the capability for determining an offset of a wireless access node may be better understood by way of reference to the exemplary wireless communication system of FIG. 1.

Figure 1:
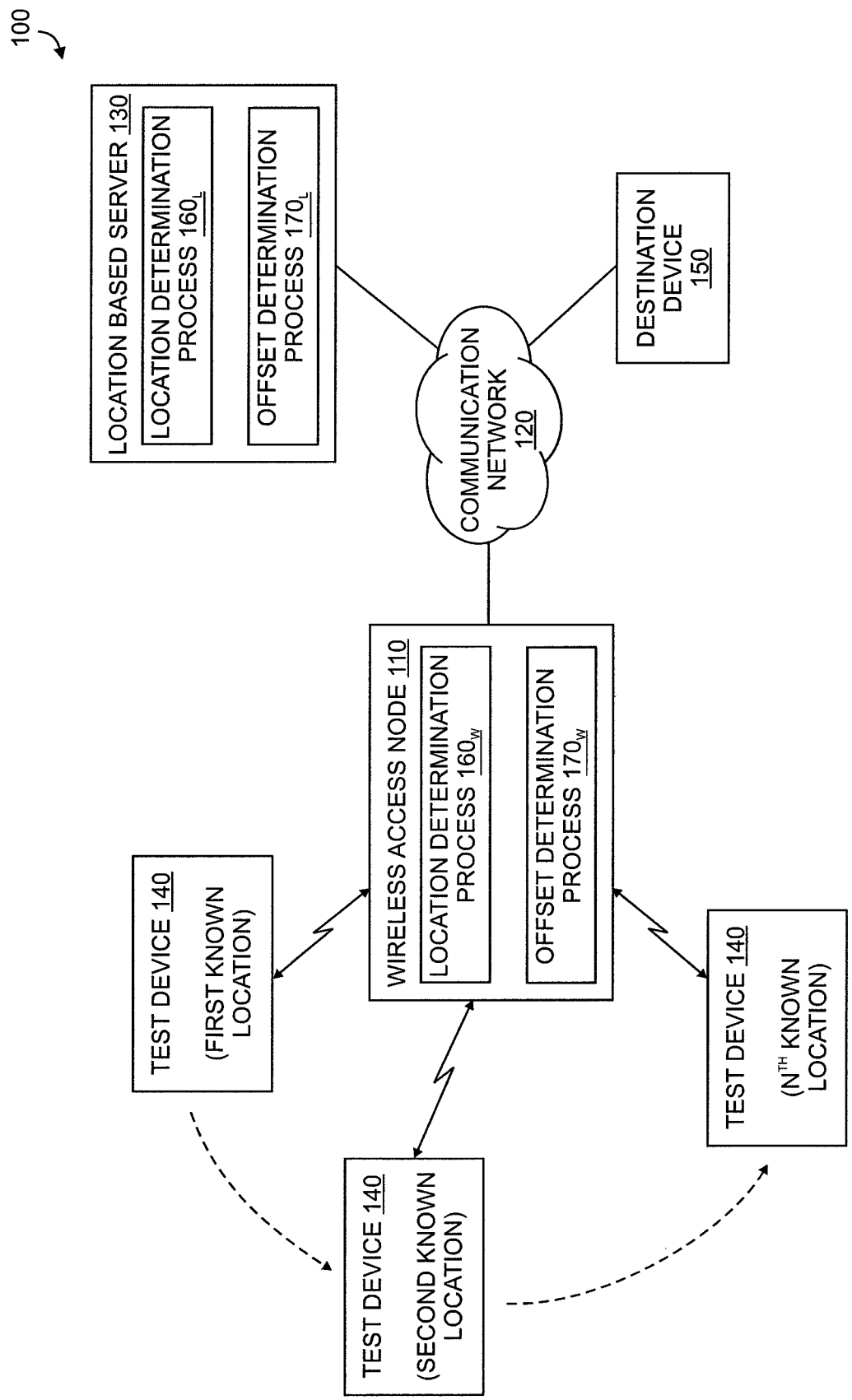
FIG. 1 depicts an exemplary wireless communication system configured to support a capability to determine an offset of a wireless access node.

FIG. 1 depicts an exemplary wireless communication system configured to support a capability to determine an offset of a wireless access node.

The wireless communication system 100 includes a wireless access node 110, a communication network 120, and a location based server 130. The wireless communication system 100 also includes a test device 140 and a destination device 150. As depicted in FIG. 1, wireless access node 110, location based server 130, and destination device 150 are communicatively connected to the communication network 120. It will be appreciated that, although primarily depicted and described with respect to a single wireless access node 110, the wireless communication system 100 may include one or more additional wireless access nodes (which are omitted for purposes of clarity). It also will be appreciated that although primarily depicted and described with respect to use of a single test device 140 and a single destination device 150 to determine an offset of wireless access node 110, one or more additional test devices 140 or one or more additional destination devices 150 (again, which are omitted for purposes of clarity) may be used to determine an offset of wireless access node 110.

The wireless access node 110 is configured to operate as a wireless point of access for mobile wireless devices located within wireless range of the wireless access node 110 (which are omitted for purposes of clarity). For example, wireless access node 110 may be a base station of a cellular communication network (e.g., a base transceiver station (BTS) of a Code Divisional Multiple Access (CDMA) network, a NodeB of a Universal Mobile Telecommunications System (UMTS) network, an evolved NodeB (eNodeB) of a Long Term Evolution (LTE) network, or the like), a wireless access point (WAP) of a Wireless Fidelity (WiFi) network, or any other suitable type of wireless access node. For example, the types of mobile wireless devices which may access wireless access node 110 may include cellular phones, smartphones, tablet computers, laptop computers, or the like. The typical operation of wireless access nodes and mobile wireless devices will be understood by one skilled in the art.

The communication network 120 may include any communication network(s) suitable for communicating with a wireless access node, such as wireless access node 110. For example, communication network 120 may include a portion of a wireless access network (e.g., wireless access backhaul), a wireless core network, a public data communication network (e.g., the Internet), a private data communication network, or the like, as well as various combinations thereof.

The location based server 130 is configured to provide location-based services for mobile wireless devices communicating via wireless access nodes of wireless communication system 100 (illustratively, via the wireless access node 110). In general, location-based services are a general class of services that make use of the geographic locations of mobile wireless devices to provide various services and service enhancements for the mobile devices. For example, various applications run by mobile wireless devices, such as smartphones and tablets, may make use of location-based services to provide functions such as identifying businesses located nearby (e.g., a nearby gas station or restaurant), providing location-based commerce, providing personalized location-based weather reports, or the like, as well as various combinations thereof. It is noted that, in at least some types of wireless communication networks, some or all of the location-based services typically provided by a location-based server may be provided by one or more of the wireless access nodes instead of a location-based server, may be provided by one or more of the wireless access nodes in addition to or in conjunction with a location-based server, or the like.

The wireless communication system 100 supports a location determination mechanism that is configured to determine geographic locations of mobile wireless devices communicating via wireless access node 110 of wireless communication system 100. The location determination mechanism of wireless communication system 100 may be provided using a location determination process or processes available on wireless access node 110 (illustratively, location determination process $160_W$), a location determination process or processes available on location based server 130 (illustratively, location determination process $160_L$), or the like, as well as various combinations thereof. The location determination process $160_W$ of wireless access node 110 may be configured for use by the wireless access node 110 to determine the geographic locations of mobile wireless devices communicating via wireless access node 110. It is noted that, where wireless communication system 100 includes one or more other wireless access nodes, some or all of the one or more other wireless access nodes also may include a location determination process or processes, respectively. The location determination process $160_L$ of location based server 130 may be configured to determine the geographic locations of mobile wireless devices communicating via any wireless access nodes for which the location based server 130 is configured to provide location based services (e.g., wireless access node 110, and any other wireless access node(s) for which location based server 130 is configured to provide location based services). For example, where wireless access node 110 includes location determination process $160_W$, the wireless access node 110 may not need to request that the location based server 130 use location determination process $160_L$ to determine geographic locations of mobile wireless devices on behalf of wireless access node 110 (or the location based server 130 may not even include the location determination process $160_L$). Similarly, for example, where wireless access node 110 does not include location determination process $160_W$, the wireless access node 110 may be configured to request that the location based server 130 use location determination process $160_L$ to determine geographic locations of mobile wireless devices on behalf of wireless access node 110. The location determination process $160_W$ and the location determination process $160_L$ each may be considered to be associated with wireless access node 110 in that either or both of location determination process $160_W$ or location determination process $160_L$ may determine the locations of mobile wireless devices communicating via wireless access node 110. The location determination process $160_W$ and the location determination process $160_L$ may be referred to collectively as location determination processes 160. It will be appreciated that a location determination process 160 that is used to determine the geographic locations of mobile wireless devices may be based on any suitable mechanism for determining the geographic location of a mobile wireless device (e.g., based on time-of-arrival (ToA) measurements between the wireless access node and the mobile wireless device, based on time difference measurement techniques for locating a mobile wireless node using multilateration, or based on any other suitable mechanism(s)). It also will be appreciated that implementation of a location determination process 160 that is used to determine the geographic locations of mobile wireless devices may depend on characteristics of the wireless communication network 100, such as the underlying wireless technology type (e.g., CDMA, UMTS, or the like), the version of the underlying wireless technology (e.g., Third Generation, Fourth Generation, or the like), or the like, as well as various combinations thereof). For example, where wireless access node 110 is an eNodeB of a 4G LTE wireless communication network, the location determination process 160 that is used by or for wireless access node 110 may be implemented using Enhanced-Cell ID (E-CID), which is a network-based technology that combines Cell ID with Timing Advance (TA) which measures the distance between wireless access node 110 and the mobile wireless device (e.g., User Equipment (UE)) in order to increase the level of accuracy over basic Cell ID techniques. For example, where wireless access node 110 is an eNodeB of a 4G LTE wireless communication network including other eNodeBs, the location determination process 160 that is used by or for wireless access node 110 may be implemented using Down Link-Observed Time Difference of Arrival (DL-OTDOA), which is a time difference measurement technique for locating a mobile wireless node using multilateration (also known as hyperbolic positioning) using three or more eNodeBs in which the mobile wireless device measures the time-difference-of arrival (TDOA) of specified Position Reference Signals (PRS) from wireless access node 110 and two or more neighboring eNodeBs and the location of the mobile wireless device is calculated based on the OTDOA measurements and the geographic location of the wireless access node 110. It will be appreciated that various other suitable types of location determination processes may be used as a location determination process 160 for determining geographic locations of mobile wireless devices communicating via wireless access node 110.

The wireless communication system 100 also includes an offset determination mechanism that is configured to determine the offset of the wireless access node 110. In general, the offset of a wireless access node includes any time delay imparted to communications traversing the wireless access node, where the time delay may be due to one or more of internal communications between elements within the wireless access node, one or more environmental factors associated with the wireless access node, or the like, as well as various combinations thereof. For example, where wireless access node 110 is a cellular base station, the offset of wireless access node 110 may include a delay resulting from separation of the global positioning system (GPS) antenna(s) of the wireless access node 110 and the cell antenna(s) of the wireless access node 110. As previously described, most (if not all) location determination processes which may be used in order to determine geographic locations of mobile wireless devices communicating via a wireless access node rely on an accurate measure of the offset of the wireless access node in order to accurately determine the geographic locations of mobile wireless devices communicating via the wireless access node. As such, the offset of a wireless access node also may be said to be indicative of communication delay that negatively impacts accuracy of a location determination process used for determining locations of mobile wireless devices communicating via the wireless access node. Accordingly, as noted above, wireless communication system 100 includes an offset determination mechanism that is configured to determine the offset of wireless access node 110 (e.g., for use by a location determination process 160 associated with wireless access node 110 to remove, or at least reduce, the effect of the offset of wireless access node 110 on location estimates determined for mobile wireless devices communicating via the wireless access node 110). The offset determination mechanism for wireless access node 110 may be implemented using an offset determination process available on the wireless access node (illustratively, offset determination process $170_W$), an offset determination process available on location based server 130 (illustratively, offset determination process $170_L$), or the like, as well as various combinations thereof. The various implementations of the offset determination mechanism of wireless communication system 110 for determining the offset of wireless access node 110 may be better understood by considering embodiments of a general implementation of an offset determination mechanism for a wireless access node.

In at least some embodiments, an offset determination mechanism for a wireless access node may be configured to determine the offset of the wireless access node using a location determination process associated with the wireless access node. In at least some embodiments, an offset determination mechanism for a wireless access node may be configured to determine the offset of the wireless access node by determining a known location of a device for a communication by the device via the wireless access node, determining an estimated location of the device for the communication by the device via the wireless access node where the estimated location of the device is determined using a location determination process associated with the wireless access node, and determining the offset of the wireless access node based on the known location of the device and the estimated location of the device.

In at least some embodiments, an offset determination mechanism for a wireless access node may be configured to determine the offset of the wireless access node using location information associated with a set of test communications initiated from a set of test devices (illustratively, test device 140 and, optionally, one or more additional test devices) to a set of destination devices (illustratively, destination device 150 and, optionally, one or more additional destination devices) via the wireless access node. The set of test communications may include one or more test communications, although it will be appreciated that the accuracy of the offset of the wireless access node may be improved as the amount of location information increases with increases in the number of test communications in the set of test communications. In general, for a given test communication initiated from a given test device via a wireless access node, the offset determination mechanism for the wireless access node (1) determines a known location of the given test device for the given test communication and (2) determines an estimated location of the given test device for the given test communication based on a location determination process associated with the wireless access node. The location information (e.g., known location or estimated location) for a test communication may be represented in any suitable format (e.g., as GPS coordinates or in any other suitable manner for representing geographic locations). Accordingly, the location information for a set of test communications may include the known location(s) and estimated location(s) of the test communication(s) in the set of test communications (which also may be referred to as being one or more known/estimated location pairs associated with one or more test communications in the set of test communications). The offset determination mechanism for the wireless access node determines the offset of the wireless access node using the set of location information determined based on the set of test communications (e.g., using the known location(s) and estimated location(s) of the test communication(s) in the set of test communications).

The use of a set of test devices and a set of destination devices to produce location information for use in determining an offset of a wireless access node may be performed in various ways. For example, as depicted in FIG. 1, a single test device (illustratively, test device 140) may perform three test communications to the same destination device (illustratively, destination device 150) via wireless access node 110 at three different geographic locations, thereby producing three known/estimated location pairs for use by the offset determination mechanism for the wireless access node 110 in determining the offset of the wireless access node 110. Similarly, for example, a single test device may perform twenty test communications to a single destination device via wireless access node 110 at twenty different geographic locations, thereby producing twenty known/estimated location pairs for use by the offset determination mechanism for the wireless access node 110 in determining the offset of the wireless access node 110. Similarly, for example, a single test device may perform ten test communications to two different destination devices via wireless access node 110 at five different geographic locations (e.g., two test communications at each geographic location to each of the respective destination devices), thereby producing ten known/estimated location pairs for use by the offset determination mechanism for the wireless access node 110 in determining the offset of the wireless access node 110. Similarly, for example, three test devices may perform twenty-four test communications to a single destination device via wireless access node 110 at twenty-four different geographic locations (e.g., eight test communications per test device, each directed to the same destination device), thereby producing twenty-four known/estimated location pairs for use by the offset determination mechanism for the wireless access node 110 in determining the offset of the wireless access node 110. It will be appreciated that various other numbers of test communications, test locations, test devices, or destination devices may be used to generate the location information that is processed by the offset determination mechanism for the wireless access node 110 in order to determine the offset of the wireless access node 110.

The use of a set of test devices and a set of destination devices to produce location information for use in determining an offset of a wireless access node may be implemented in various ways. The test device(s) may include any type(s) of device(s) configured for communicating via the wireless access node. For example, test device 140 (or any other test device(s) which may be used) may be a cellular telephone, a smartphone, a tablet computer, a laptop, or the like. The test communication(s) initiated from the test device(s) may include any suitable type(s) of communication(s), such as telephone calls, text messages, establishment of data sessions, transmission of content via data sessions, communication associated with invocation or use of a service or application making use of location based services of wireless communication system 100, or the like, as well as various combinations thereof. The destination device(s) may include any type(s) of device(s) configured for receiving communications initiated from a test device. For example, destination device 150 (or any other destination device(s) which may be used) may be a cellular telephone, a smartphone, a tablet computer, a laptop, a desktop computer, a wireline telephone, a network device, or the like. The wireless access node may be configured to recognize the test communications (e.g., to distinguish the test communications from other communications transported via the wireless access node), such that the test communications may be processed in order to produce the location information that is used by the offset determination mechanism for the wireless access node to determine the offset of the wireless access node. The wireless access node may be configured to recognize a test communication based on one or more of a source of the test communication, an intended destination of the test communication, a communication type of test communication, an explicit marking in the test communication, or the like, as well as various combinations thereof. The wireless access node may be configured to handle test communications in any suitable manner (e.g., performing local processing to prevent forwarding of a test communication, forwarding a test communication toward an intended destination device for the test communication, or the like). The various implementations of an offset determination mechanism for a wireless access node, for use in determining the offset of the wireless access node using a location determination process associated with the wireless access node, may be better understood by considering wireless access node 110 of FIG. 1.

In at least some embodiments, the determination of the offset of wireless access node 110 is performed locally at the wireless access node 110. In at least some embodiments, offset determination process $170_W$ of wireless access node 110 is configured to determine a known location of test device 140 for a test communication received from test device 140, determine an estimated location of test device 140 for the test communication using the location determination process $160_W$ of wireless access node 110, and determine the offset of wireless access node 110 based on the known location of test device 140 and the estimated location of test device. The offset determination process $170_W$ of wireless access node 110 may determine the known location of a given test device for a given test communication in any suitable manner (e.g., determining the known location from the test communication where the known location is provided in-band as part of the test communication, receiving the known location from the given test device out-of-band via a communication channel separate from the test communication, or the like). It will be appreciated that, although primarily described with respect to embodiments in which wireless access node 110 determines the offset of wireless access node 110 based on a single test communication, in at least some embodiments wireless access node 110 may determine the offset of wireless access node 110 based on a threshold number of test communications. In at least some embodiments, the offset determination process $170_W$ of wireless access node 110 is configured to initiate use of the determined offset of wireless access node 110 by the location determination process for the wireless access node 110 (e.g., making the determined offset of wireless access node 110 available locally for use by location determination process $160_W$ of wireless access node 110 in determining locations of mobile wireless devices communicating via wireless access node 110, providing the determined offset of wireless access node 110 to location based server 130 for use by location determination process $160_L$ of location based server 130 in determining locations of mobile wireless devices communicating via wireless access node 110, or the like, as well as various combinations thereof).

In at least some embodiments, the determination of the offset of wireless access node 110 is performed locally at the location based server 130. In at least some embodiments, offset determination process $170_L$ of location based server 130 is configured to determine the offset of wireless access node 110. The offset determination process $170_L$ may determine the offset of wireless access node 110 responsive to a request by wireless access node 110 for location based server 130 to determine the offset of wireless access node 110, responsive to detection by location based server 130 of a test communication initiated via wireless access node 110, or the like, as well as various combinations thereof. In at least some embodiments, offset determination process $170_L$ of location based server 130 is configured to determine a known location of test device 140 for a test communication received at wireless access node 110 from test device 140, determine an estimated location of test device 140 for the test communication using the location determination process $160_L$ of location based server 130, and determine the offset of wireless access node 110 based on the known location of test device 140 and the estimated location of test device 140. The offset determination process $170_L$ of location based server 130 may determine the known location of a given test device for a given test communication in any suitable manner (e.g., receiving the known location from the wireless access node 110 as part of a request by the wireless access node 110 for the location based server 130 to determine the offset of the wireless access node 110, determining the known location from the test communication where the known location is provided in-band as part of the test communication and the location based server 130 receives the test communication, receiving the known location from the given test device out-of-band via a communication channel separate from the test communication, or the like). It will be appreciated that, although primarily described with respect to embodiments in which wireless access node 110 triggers the request for determination of the offset of wireless access node 110 based on a single test communication, in at least some embodiments wireless access node 110 may trigger the request for determination of the offset of wireless access node 110 based on a threshold number of test communications. In at least some embodiments, the offset determination process $170_L$ of location based server 130 is configured to initiate use of the determined offset of wireless access node 110 by the location determination process for the wireless access node 110 (e.g., making the determined offset of wireless access node 110 available locally for use by location determination process $160_L$ of location based server 130 in determining locations of mobile wireless devices communicating via wireless access node 110, providing the determined offset of wireless access node 110 to wireless access node 110 for use by location determination process $160_W$ of wireless access node 110 in determining locations of mobile wireless devices communicating via wireless access node 110, or the like, as well as various combinations thereof).

In at least some embodiments, the determination of the offset of wireless access node 110 is distributed across the wireless access node 110 and the location based server 130. In at least some embodiments, the offset determination process $170_W$ of wireless access node 110 is configured to determine a known location of test device 140 for a test communication from test device 140, the offset determination process $170_W$ of wireless access node 110 is configured to determine an estimated location of test device 140 for the test communication using the location determination process $160_W$ of wireless access node 110, the offset determination process $170_W$ of wireless access node 110 is configured to provide the known location and the estimated location to the offset determination process $170_L$ of location based server 130, and the offset determination process $170_L$ of location based server 130 is configured to determine the offset of wireless access node 110 based on the known location and the estimated location. In at least some embodiments, the offset determination process $170_W$ of wireless access node 110 is configured to determine a known location of test device 140 for a test communication from test device 140, the offset determination process $170_W$ of wireless access node 110 is configured to provide the known location to the offset determination process $170_L$ of location based server 130, the offset determination process $170_L$ of location based server 130 is configured to determine an estimated location of test device 140 for the test communication using the location determination process $160_L$ of location based server 130, and the offset determination process $170_L$ of location based server 130 is configured to determine the offset of wireless access node 110 based on the known location and the estimated location. Various other distributions of such functions are contemplated. It will be appreciated that, although primarily described with respect to embodiments in which wireless access node 110 and location based server 130 cooperate to determine the offset of wireless access node 110 for a single test communication, in at least some embodiments wireless access node 110 and location based server 130 may cooperate to determine the offset of wireless access node 110 based on a threshold number of test communications. In at least some embodiments, one or both of the offset determination process $170_L$ of location based server 130 or the offset determination process $170_W$ of wireless access node 110 may be configured to initiate use of the determined offset of wireless access node 110 by the location determination process for the wireless access node 110.

In at least some embodiments, the offset determination mechanism of wireless communication system 100 may be configured to determine the offset of wireless access node 110 based on $X(i)=D(i)+dD+dx(i)$, where $D(i)$ is the known location of the test device 140 for the test communication i, $X(i)$ is the estimated location of the test device 140 for the test communication i, dD is the offset for the wireless access node 110, and $dx(i)$ is the random error for the test communication. It is noted that the index i corresponds to the test communication for which the offset for the wireless access node 110 (i.e., dD) is being determined, where i may be equal to or greater than one (indicative of one or more test communications in the set of test communications). It is noted that this equation allows for random errors in use of a location determination process 160 associated with wireless access node 110 to determine the estimated location of the test device 140 for the test communication. In at least some embodiments, the random error $dx(i)$ for the test communication may be modeled as a random process (e.g., a Gaussian random process or any other suitable type of random process). In at least some embodiments, an estimator (e.g., a Maximum Likelihood Estimator (MLE) or other suitable type of estimator) may be used to estimate the random error $dx(i)$ for the test communication. As previously indicated, it is expected that the determined offset of the wireless access node 110 (i.e., dD) will converge toward the actual offset of the wireless access node 110 with increases in the set of location information resulting from increases in the set of test communications (e.g., the determined offset of the wireless access node 110 is expected to converge toward the actual offset of the wireless access node 110 within a reasonable margin of error given a reasonable set of location information produced by a reasonable set of test communications).

As discussed above, the determined offset of a wireless access node may be used to calibrate or recalibrate a location determination process associated with the wireless access node. The determined offset of the wireless access node may be used to perform an initial calibration of the wireless access node prior to deployment of the wireless access node, to perform an initial calibration of the wireless access node after deployment of the wireless access node but prior to in-service use of the wireless access node, to periodically recalibrate the wireless access node, to recalibrate the wireless access node responsive to a detected condition, or the like, as well as various combinations thereof. The determined offset of the wireless access node may be used to adapt the operation of the location determination process associated with the wireless access node. The determined offset of the wireless access node may be used by the location determination process associated with the wireless access node in determining locations of mobile wireless devices communicating via the wireless access node. The determined offset of the wireless access node may be used by a location determination process associated with the wireless access node the next time the location determination process associated with the wireless access node is used to determine an updated offset for the wireless access node. The determined offset of a wireless access node may be used in various other ways to improve the operation of the wireless access node, to improve the operation of a location determination process associated with the wireless access node, or the like, as well as various combinations thereof.

As discussed above, the offset determination mechanism of wireless communication system 100 is configured to process location information associated with a set of test communications performed via wireless access node 110 in order to determine the offset of the wireless access node 110. In at least some embodiments (an exemplary embodiment is depicted and described with respect to FIG. 2), the offset determination mechanism may be configured to determine the offset of the wireless access node 110 as each known/estimated location pair is determined (e.g., for each test communication). In at least some embodiments (an exemplary embodiment is depicted and described with respect to FIG. 3), the offset determination mechanism may be configured to determine the offset of the wireless access node 110 after the set of location information, for the associated set of test communications to be used in determining the offset of the wireless access node, is determined. It will be appreciated that various combinations of such location information processing may be used by the offset determination mechanism in order to determine the offset of the wireless access node 110.

Figure 2:
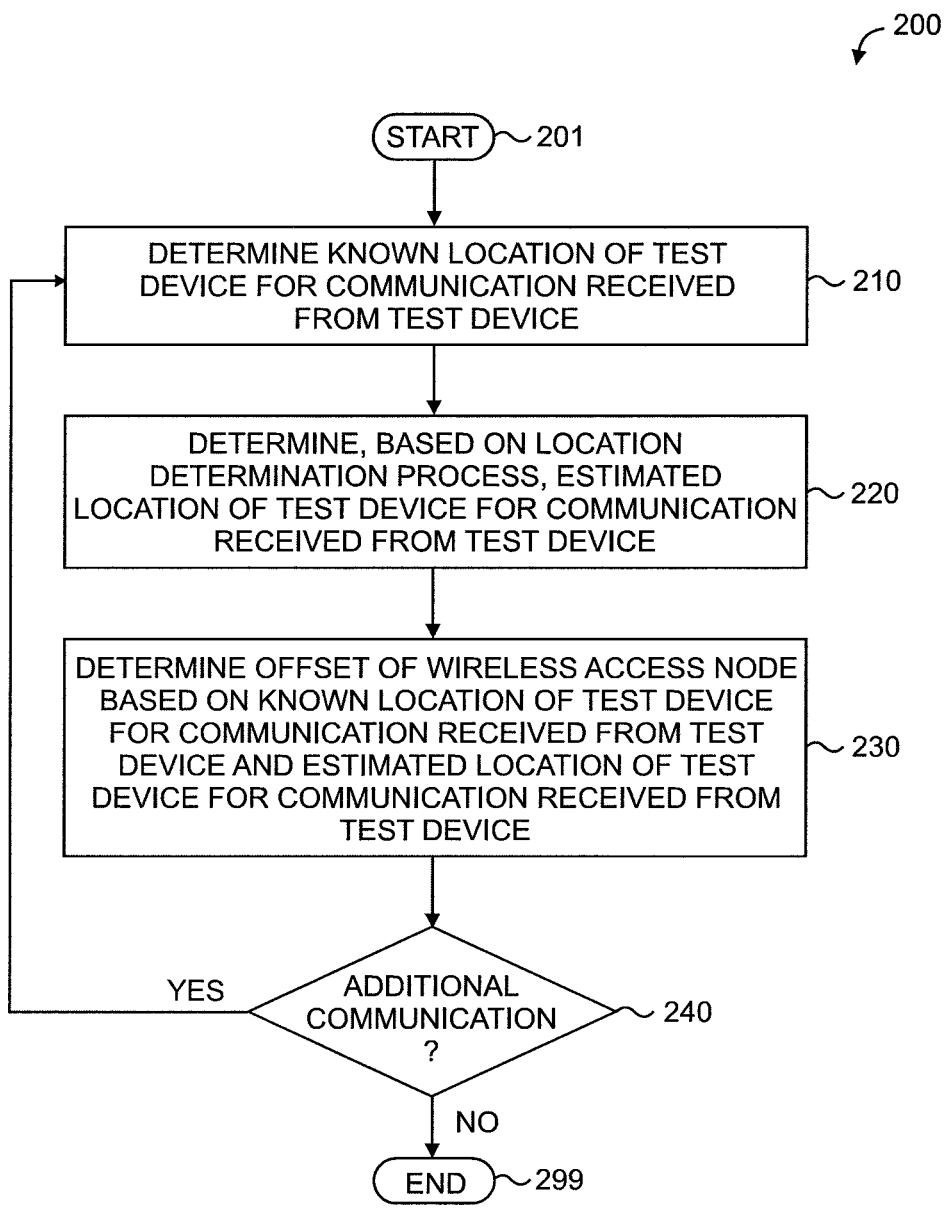
FIG. 2 depicts an embodiment of a method for determining an offset of a wireless access node.

FIG. 2 depicts an embodiment of a method for determining an offset of a wireless access node. It will be appreciated that, although primarily depicted and described herein as being performed serially, at least a portion of the steps of method 200 of FIG. 2 may be performed contemporaneously or in a different order than depicted in FIG. 2.

At step 201, method 200 begins.

At step 210, a known location of a test device, for a communication received at the wireless access node from a test device, is determined. The communication may be a first communication or a next communication, depending on the number of communications used for determining the offset of the wireless access node.

At step 220, an estimated location of the test device, for the communication received at the wireless access node from the test device, is determined based on a location determination process associated with the wireless access node.

At step 230, an offset of the wireless access node is determined based on the known location of the test device and the estimated location of the test device. The determination of the offset of the wireless access node may be an initial determination of the offset of the wireless access node, a refinement of an existing offset of the wireless access node, or the like.

At step 240, a determination is made as to whether an additional communication is to be used in further determining/refining the offset of the wireless access node. In response to a determination that an additional communication is to be used in further determining/refining the offset of the wireless access node, method 200 returns to step 210. It will be appreciated that, given that it may be desirable to further refine the offset of the wireless access node using communications from multiple geographic locations, there may be a delay between execution of step 240 and the return to step 210 (e.g., where the same test device is being used and the test device moves or is moved to a new location prior to initiation of the next communication received at step 210, where multiple test devices are being used, or the like). In response to a determination that the offset of the wireless access node is not to be further determined/refined, method 200 proceeds to step 299, where method 299 ends.

At step 299, method 200 ends.

Figure 3:
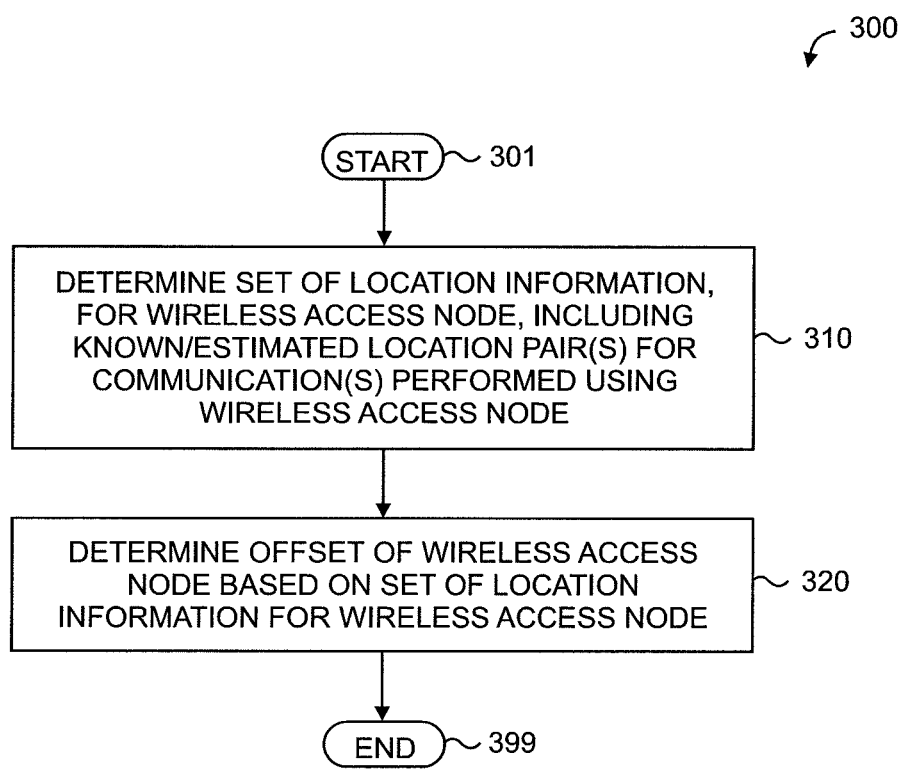
FIG. 3 depicts an embodiment of a method for determining an offset of a wireless access node.

FIG. 3 depicts an embodiment of a method for determining an offset of a wireless access node. It will be appreciated that, although primarily depicted and described herein as being performed serially, at least a portion of the steps of method 300 of FIG. 3 may be performed contemporaneously or in a different order than depicted in FIG. 3.

At step 301, method 300 begins.

At step 310, a set of location information is determined for the wireless access node. The set of location information includes, for each of one or more communications performed via the wireless access node, a known location of a test device for the communication performed using the wireless access node and an estimated location of the test device for the communication performed using the wireless access node. As previously described, the set of location information may be determined based on communications initiated using one or more test devices.

At step 320, an offset of the wireless access node is determined based on the set of location information (e.g., based on each of the pairs of known and estimated locations of the set of location information). For example, the pairs of known and estimated locations may be processed separately to determine respective offset values and the offset values may then be averaged to arrive at a final offset that is based on the set of location information. For example, the pairs of known and estimated locations may be processed together to arrive at a final offset that is based on the set of location information. The set of location information may be processed in other ways to determine a final offset that is based on the set of location information.

At step 399, method 300 ends.

Figure 4:
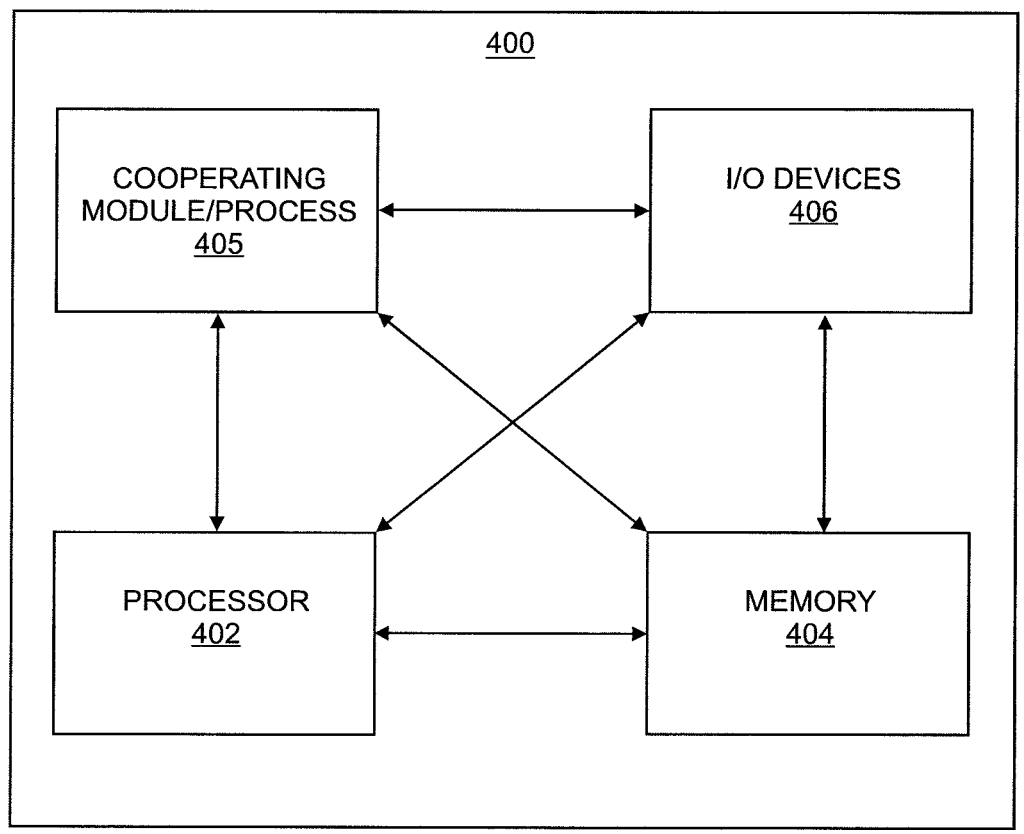
FIG. 4 depicts a high-level block diagram of a computer suitable for use in performing functions presented herein.

FIG. 4 depicts a high-level block diagram of a computer suitable for use in performing functions described herein.

The computer 400 includes a processor 402 (e.g., a central processing unit (CPU) and/or other suitable processor(s)) and a memory 404 (e.g., random access memory (RAM), read only memory (ROM), and the like).

The computer 400 also may include a cooperating module/process 405. The cooperating process 405 can be loaded into memory 404 and executed by the processor 402 to implement functions as discussed herein and, thus, cooperating process 405 (including associated data structures) can be stored on a computer readable storage medium, e.g., RAM memory, magnetic or optical drive or diskette, and the like.

The computer 400 also may include one or more input/output devices 406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 400 depicted in FIG. 4 provides a general architecture and functionality suitable for implementing functional elements described herein and/or portions of functional elements described herein. For example, computer 400 provides a general architecture and functionality suitable for implementing one or more of wireless access node 110, location based server 130, test device 140, destination device 150, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking various methods described herein may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    a processor and a memory communicatively connected to the processor, the processor configured to:
        determine a known location of a device for a communication received at a wireless access node from the device, wherein an offset of the wireless access node is indicative of a time delay imparted to communications traversing the wireless access node;
        determine an estimated location of the device for the communication received at the wireless access node from the device, wherein the estimated location of the device is determined based on a location determination process associated with the wireless access node, wherein the location determination process is configured to determine the estimated location of the device based on a current offset of the wireless access node; and
        determine a new offset of the wireless access node based on the known location of the device and the estimated location of the device.

2. The apparatus of claim 1, wherein the processor is configured to determine the known location of the device for the communication from information included within the communication or based on receipt of the known location from the wireless access node.

3. The apparatus of claim 1, wherein the processor is configured to determine the estimated location of the device for the communication based on execution of the location determination process at the wireless access node or based on execution of the location determination process at a location based server associated with the wireless access node.

4. The apparatus of claim 1, wherein the processor is configured to determine the new offset of the wireless access node based on $X=D+dD+dx$, wherein:
    D is the known location of the device for the communication received at the wireless access node from the device;
    X is the estimated location of the device for the communication received at the wireless access node from the device;
    dD is the current offset of the wireless access node; and
    dx is an error for the communication received at the wireless access node from the device.

5. The apparatus of claim 4, wherein the error for the communication received at the wireless access node from the device is a random error modeled based on a random process.

6. The apparatus of claim 1, wherein the processor is configured to:
    execute the location determination process using the new offset of the wireless access node.

7. The apparatus of claim 1, wherein the apparatus is the wireless access node or a location based server associated with the wireless access node.

8. A method, comprising:
    using a processor and a memory for:
        determining a known location of a device for a communication received at a wireless access node from the device, wherein an offset of the wireless access node is indicative of a time delay imparted to communications traversing the wireless access node;
        determining an estimated location of the device for the communication received at the wireless access node from the device, wherein the estimated location of the device is determined based on a location determination process associated with the wireless access node, wherein the location determination process is configured to determine the estimated location of the device based on a current offset of the wireless access node; and
        determining a new offset of the wireless access node based on the known location of the device and the estimated location of the device.

9. The method of claim 8, wherein the known location of the device for the communication is determined from information included within the communication or based on receipt of the known location from the wireless access node.

10. The method of claim 8, wherein the estimated location of the device for the communication is determined based on execution of the location determination process at the wireless access node or based on execution of the location determination process at a location based server associated with the wireless access node.

11. The method of claim 8, wherein the new offset of the wireless access node is determined based on $X=D+dD+dx$, wherein:
    D is the known location of the device for the communication received at the wireless access node from the device;
    X is the estimated location of the device for the communication received at the wireless access node from the device;
    dD is the current offset of the wireless access node; and
    dx is an error for the communication received at the wireless access node from the device.

12. The method of claim 11, wherein the error for the communication received at the wireless access node from the device is a random error modeled based on a random process.

13. The method of claim 8, further comprising:
executing the location determination process using the new offset of the wireless access node.

14. The method of claim 8, wherein the method is executed by the wireless access node or a location based server associated with the wireless access node.

15. A non-transitory computer-readable storage medium storing instructions which, when executed by a computer, cause the computer to perform a method, the method comprising:
determining a known location of a device for a communication received at a wireless access node from the device, wherein an offset of the wireless access node is indicative of a time delay imparted to communications traversing the wireless access node;
determining an estimated location of the device for the communication received at the wireless access node from the device, wherein the estimated location of the device is determined based on a location determination process associated with the wireless access node, wherein the location determination process is configured to determine the estimated location of the device based on a current offset of the wireless access node; and
determining a new offset of the wireless access node based on the known location of the device and the estimated location of the device.

16. The non-transitory computer-readable storage medium of claim 15, wherein the known location of the device for the communication is determined from information included within the communication or based on receipt of the known location from the wireless access node.

17. The non-transitory computer-readable storage medium of claim 15, wherein the estimated location of the device for the communication is determined based on execution of the location determination process at the wireless access node or based on execution of the location determination process at a location based server associated with the wireless access node.

18. The non-transitory computer-readable storage medium of claim 15, wherein the new offset of the wireless access node is determined based on $X=D+dD+dx$, wherein:
D is the known location of the device for the communication received at the wireless access node from the device;
X is the estimated location of the device for the communication received at the wireless access node from the device;
dD is the current offset of the wireless access node; and
dx is an error for the communication received at the wireless access node from the device.

19. The non-transitory computer-readable storage medium of claim 18, wherein the error for the communication received at the wireless access node from the device is a random error modeled based on a random process.

20. The non-transitory computer-readable storage medium of claim 15, the method further comprising:
executing the location determination process using the new offset of the wireless access node.

21. The non-transitory computer-readable storage medium of claim 15, wherein the computer-readable storage medium is configured to be disposed within the wireless access node or a location based server associated with the wireless access node.

* * * * *